(12) United States Patent
Narumi et al.

(10) Patent No.: US 6,317,301 B2
(45) Date of Patent: Nov. 13, 2001

(54) MAGNETORESISTIVE EFFECT TYPE REPRODUCING HEAD AND MAGNETIC DISK APPARATUS EQUIPPED WITH THE REPRODUCING HEAD

(75) Inventors: Shun-ichi Narumi; Hiroshi Fukui; Katsumi Hoshino, all of Hitachi; Katsuo Watanabe, Kanasagou-machi; Kazue Kudo; Moriaki Fuyama, both of Hitachi, all of (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/116,526

(22) Filed: Jul. 16, 1998

(30) Foreign Application Priority Data

Jul. 18, 1997 (JP) .................................... 9-193593

(51) Int. Cl.$^7$ .............................. G11B 5/127; G11B 5/29
(52) U.S. Cl. ...................................... 360/327.32; 360/121
(58) Field of Search ........................ 360/113, 126, 360/3, 313, 125, 121, 327.32

(56) References Cited

U.S. PATENT DOCUMENTS 5,018,037 * 5/1991 Krounbi et al. ................... 360/113
5,958,612 * 9/1999 Saito et al. ........................ 360/113
5,959,810 * 9/1999 Kakihara et al. .................. 360/113

FOREIGN PATENT DOCUMENTS 8124121   5/1996   (JP) .
95/18442  6/1995   (WO) .

OTHER PUBLICATIONS

Patent Abstracts of Japan, Publication No. 60193102, Publication Date–Oct. 1, 1985.
Patent Abstracts of Japan, Publication No. 60239911, Publication Date–Nov. 28, 1985.

* cited by examiner

Primary Examiner—Allen Cao
(74) Attorney, Agent, or Firm—Antonelli, Terry, Stout & Kraus, LLP

(57) ABSTRACT

A magnetoresistive effect type reproducing head is formed by stacking a lower magnetic shield made of magnetic material, a lower inter-layer insulation film, a magnetoresistive effect type element for detecting a magnetic field by using a magnetoresistive effect, an upper inter-layer insulation film, and an upper magnetic shield made of magnetic material, on a substrate in this order, wherein the resistivity of at least one of the lower and upper magnetic shields is more than 200 $\mu\Omega\cdot$cm.

4 Claims, 8 Drawing Sheets

MAGNETORESISTIVE EFFECT TYPE REPRODUCING HEAD AND MAGNETIC DISK APPARATUS EQUIPPED WITH THE REPRODUCING HEAD

BACKGROUND OF THE INVENTION

The present invention relates to a new magnetoresistive effect type reproducing head, and a recording-reproducing separation type magnetic head, a head disk assembly and a magnetic disk apparatus, which use the reproducing head.

A magnetoresistive effect type reproducing head using a magnetoresistive effect or a giant magnetoresistive effect is made of a magnetic multi-layer film, which exhibits the magnetoresistive effect or the giant magnetoresistive effect, a magnetoresistive effect type element including electrodes provided at both sides of the magnetic multi-layer film, and magnetic shield films arranged at the upper and lower sides of the magnetoresistive effect type element.

A principle of magnetic field detection using a magnetoresistive effect type element is based on use of a phenomena in which the electrical resistance of a magnetic multi-layer film changes corresponding to the strength of a magnetic field applied to the magnetic multi-layer film, which possesses a magnetoresistive effect or a giant magnetoresistive effect. Further, changes in the applied magnetic field are defected by causing a current to flow in the magnetic multi-layer film and then measuring the potential difference generated across the magnetic multi-layer film. However, this principle is well known.

In reproducing a stray magnetic field from information magnetically recorded in a magnetic disk installed in a magnetic disk apparatus, it is well known to cover the upper and lower sides of a magnetoresistive effect type element with magnetic shield films via an insulating layer in order to improve the spatial resolution and reduce the effects of magnetic field leakage, such as from a motor and so on, which tends to cause noise.

For development of a method of more densely recording information in a magnetic disk apparatus, in order to improve the spatial resolution, it has been tried and is also well known to reduce the distance between an upper magnetic shield and a lower magnetic shield, that is, the magnetic gap of a reproducing head. Further, conventionally, 80Ni—Fe permalloy, Fe—Al—Si Sendust, Co noncrystalline magnetic material, etc., are mainly used for a magnetic shield film. Further, Japanese Patent Laid-Open 124121/1996 discloses a magnetic shield of Ni—Fe—P alloy or Ni—Fe—B alloy that is formed by an electroplating method.

A magnetoresistive effect type reproducing head has a structure in which a magnetoresistive effect type clement is formed on a lower magnetic shield via an insulation film, and an upper magnetic shield is also formed on the magnetoresistive effect type element via an insulation film.

In order to satisfy the requirement for a high increase in the recording density, especially, the linear recording density, in a magnetic disk apparatus, the distance between the lower magnetic shield and the upper magnetic shield is reduced to improve the spatial resolution. For this purpose, the thickness of the respective insulation films between a magnetoresistive effect type or giant magnetoresistive effect type element and each of the upper and lower magnetic shields is largely reduced. Thus, the withstand voltage between the magnetoresistive effect type element and the respective upper and lower magnetic shields tends to be easily deteriorated. It is believed that the deterioration of the withstand voltage in the insulation films is caused by pin holes in the insulation films.

The respective resistivities ρ of a 80Ni—Fe permalloy film, a Fe—Al—Si Sendust film, and a Co—Nb—Zr alloy film, which are conventionally used for the upper and lower magnetic shield films, is approximately 20 $\mu\Omega$·cm, 80 $\mu\Omega$·cm, and 100–150 $\mu\Omega$·cm, respectively. On the other hand, the average resistivity ρ of a sensor part in a magnetoresistive effect type element, although the resistivity depends on the composition of the sensor part, is approximately 20–100 $\mu\Omega$·cm. That is, the resistivity of the sensor part in a magnetoresistive effect type element is approximately the same as that of the magnetic shields. Moreover, since the thickness of the sensor part in a magnetoresistive effect type element is about 50 nm, and the thickness of the magnetic shields is about 1–3 nm, the resistance of the sensor part in a magnetoresistive effect type element is less than 1/20 of that of a corresponding region in each magnetic shield. Therefore, if the magnetic gap is reduced, it is possible that current will leak from a pin hole generated in a part, such as a boundary region between each electrode and the sensor part in a magnetoresistive effect type element, at which the thickness of the gap is large and the thickness of the insulation film tends to become thin, and an insulation break-down of the magnetoresistive effect type element is caused by such a current leakage. Even if the current leakage occurs without an element break-down, since the resistance of the sensor part in a magnetoresistive effect type element is less than 1/20 of that of a corresponding region in each magnetic shield, the largest amount of current flows into the magnetic shields, and information reproduction by the magnetoresistive effect type element becomes impossible. This problem is an inevitable result of reducing the magnetic gap of the presently used structure in a magnetoresistive effect type element.

SUMMARY OF THE INVENTION

An object of the present invention is to provide a new magnetoresistive effect type reproducing head, and a recording-reproducing separation type magnetic head, a head disk assembly and a magnetic disk apparatus, using the reproducing head, which can prevent a degradation of the withstand voltage between a magnetoresistive effect type element and each of an upper magnetic shield and a lower magnetic shield, the degradation being caused when the thickness of the insulation film formed between a magnetoresistive effect type element end each of the magnetic shields is made very thin to accommodate the requirement for a high recording density.

A feature of the present invention to attain the above object is to provide a magnetoresistive effect type reproducing head formed by stacking on a substrate in the following order a lower magnetic shield made of magnetic material; a lower inter-layer insulation film; a magnetoresistive effect type element including a magnetic part, an insulation part and electrical conductivity parts, for detecting a magnetic field by using one of a magnetoresistive effect and a giant magnetoresistive effect; an upper inter-layer insulation film; and an upper magnetic shield made of magnetic material. It is also a feature of this invention to provide a recording-reproducing separation type magnetic head including a magnetic induction type recording head and the above-mentioned reproducing head, which are disposed adjacent to each other and are separated via a magnetic shield, and wherein one or both of the lower and upper magnetic shields includes a magnetic layer having a resistivity of more than 200 $\mu\Omega$·cm.

Further, a feature of the present invention is that, in the above-described magnetoresistive effect type reproducing head, a magnetic layer possessing a resistivity of more than 200 $\mu\Omega \cdot cm$ is provided between at least one of the lower and upper magnetic shields and a corresponding one of the inter-layer insulation films.

Moreover, a feature of the present invention is that, in the above-described magnetoresistive effect type reproducing head, a magnetic layer possessing a resistivity of more than 200 $\mu\Omega \cdot cm$ is provided in at least a region covering the magnetoresistive effect type element, in at least one of the lower inter-layer insulation film and the upper inter-layer insulation film.

Further, a feature of the present invention is that, in the above-described magnetoresistive effect type reproducing head, at least one of the upper and lower magnetic shields includes a magnetic layer possessing a high resistivity of more than 200 $\mu\Omega \cdot cm$ and a low-resistance magnetic layer, which are disposed adjacent to each other and separated via an insulation layer.

Further, a feature of the present invention is to provide a magnetoresistive effect type reproducing head formed by stacking a lower inter-layer insulation film, a magnetoresistive effect type element for detecting a magnetic field by using a magnetoresistive effect, and an upper inter-layer insulation film, wherein a magnetic layer possessing a resistivity of more than 200 $\mu\Omega \cdot cm$ is provided in at least a region covering a sensor part of the magnetoresistive effect type element, in at least one of the lower inter-layer insulation film and the upper inter-layer insulation film.

The above-mentioned magnetic layer of more than 200 $\mu\Omega \cdot cm$, preferably more than 350 $\mu\Omega \cdot cm$, more preferably more than 500 $\mu\Omega \cdot cm$, is made of a chemical compound including at least one element of a group consisting of Co, Fe, and Ni and at least one element of a group consisting of O, N, F, C, P, S, and B.

Another feature of the present invention is to provide a magnetic disk apparatus including a magnetic disk having a diameter of less than 3.5 inches, a means for rotating the magnetic disk, the above-mentioned magnetoresistive effect type reproducing head and a magnetic induction type thin film recording head.

In accordance with the present invention, a magnetic film of a high resistivity (more than 200 $\mu\Omega \cdot cm$) is used at a part of at least one or both-of an upper magnetic shield film and a lower magnetic shield film, in the vicinity of a magnetic gap. Moreover, under conditions wherein the resistance of the magnetic shield films is sufficiently larger than that of the sensor part in the magnetoresistive effect type element, even if sensing current leaks into the magnetic shield films, such as may be caused by pin holes generated in an insulation film between each magnetic shield film and a magnetoresistive effect type element, the current leakage is restricted, and break-down of the magnetoresistive effect type element scarcely occurs. Assuming that a sensing current shunts to the magnetic shield, it is possible to keep any decrease of the reproducing output of the head small by suppressing the leakage current to a small quantity. Thus, it is desirable to set the resistance of the magnetic shield films to approximately 10 times that of the sensor part of the magnetoresistive effect type element.

As a magnetic film having a high resistivity and an excellent soft magnetic performance, a magnetic film made of a chemical compound of (magnetic metal (Fe, Co, Ni)-metal-X (O, F, N)), or a magnetic film made of a material produced by adding C, P, S, B, etc., to alloy of Ni—Fe, Fe—Co, Ni—Fe—Co, etc., is known.

In accordance with the present invention, magnetic material of a high resistivity is used for a part of at least one of the upper and lower magnetic shields in a reproducing head using a magnetoresistive or giant magnetoresistive effect, which is used for a recording-reproducing separation type magnetic thin film head in a magnetic disk apparatus and so forth. Therefore, under conditions where the magnetic gap determined by the distance between the upper and lower magnetic shields is narrow, even if sensing current leaks between the magnetoresistive effect type element and one of the upper and lower magnetic shields, the reproducing of information is still possible. By using a magnetoresistive effect type reproducing head having a magnetic gap which is narrow, according to the present invention, it is possible to provide a magnetic disk apparatus which exhibits a high linear recording density, and further, in which the azimuth angle correction is small, since the distance between the reproducing head and the recording head can be made narrow.

Further, a feature of the present invention is to provide a head disk assembly having a magnetic disk in which information is recorded, a recording-reproducing separation type magnetic head composed of a magnetic induction type recording head for recording information in the magnetic disk, a magnetoresistive effect type reproducing head for reproducing information recorded in the magnetic disk, and a drive means for rotating the magnetic disk, wherein the magnetoresistive effect type reproducing head has any one of the above-mentioned features, and in which the record density is more than 10 G bits/in$^2$.

Furthermore, a feature of the present invention is to provide a magnetic disk apparatus including a plurality of head disk assemblies having a magnetic disk in which information is recorded, a recording-reproducing separation type magnetic head composed of a magnetic induction type recording head for recording information in the magnetic disk, a magnetoresistive effect type reproducing head for reproducing information recorded in the magnetic disk, and a drive means for rotating the magnetic disk, wherein each head disk assembly incorporates the above latest feature of the present invention.

DETAILED DESCRIPTION OF THE EMBODIMENTS

Embodiment 1

Figure 1:
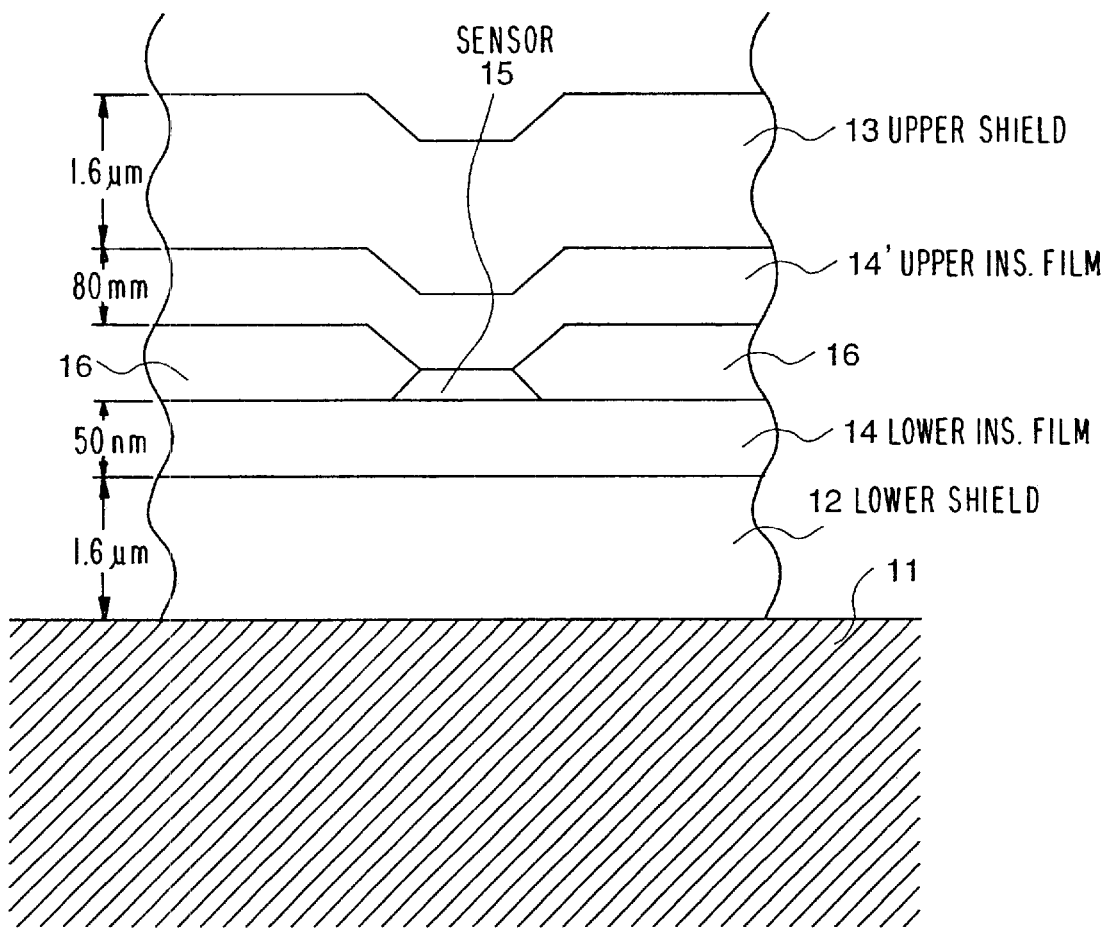
FIG. 1 is an elevational cross section, seen from a side facing a recording medium, of a magnetoresistive effect type reproducing head, representing a first embodiment according to the present invention.

FIG. 1 shows an elevational cross section, as seen from a side facing a recording medium, of a magnetoresistive effect type reproducing head, representing a first embodiment according to the present invention. The multi-layer structure shown in FIG. 1 includes a substrate 11, a lower magnetic shield 12 formed on the substrate 11, a lower inter-layer insulation film 14, a sensor part 15 of a magnetoresistive effect type element, an upper inter-layer insulation film 14', an upper magnetic shield 13, which are stacked in this order; and, electrodes 16 are provided at both sides of the sensor part 15 of the magnetoresistive effect type element. In this embodiment, Fe—Si—O possessing a resistivity $\rho$ of about 16000 $\mu\Omega\cdot$cm is used for the upper and lower magnetic shields 12 and 13. The upper and lower magnetic shields 12 and 13 have the thickness of 1.6 $\mu$m, and the magnetic gap between the upper and lower magnetic shields 12 and 13 is set to 0.18 $\mu$m. As a magnetoresistive effect type element, a magnetic resistance reading converter including a later-mentioned hard magnetic bias film is used. The sensor part 15 of the magnetoresistive effect type element has a multi-layer structure, including a magnetic film, an insulation film, and a conductive film, arranged in this order from the upper part. The magnetoresistive effect film, an intermediate film, and a bias film, have a thickness of 20 nm, 10 nm, and 20 nm, respectively. The thickness of the lower inter-layer insulation film 14 formed on the lower magnetic shield 12 is set as 50 nm, and the thickness of the upper inter-layer insulation film 14' formed on the magnetoresistive effect type element is set to 80 nm, so that the magnetoresistive effect film is positioned at the center of the magnetic gap. Since the average resistivity $\rho$ of the sensor part 15 of the magnetoresistive effect type element is about 50 $\mu\Omega\cdot$cm, and its length, width, and thickness, are 1 $\mu$m, 1 $\mu$m, and 50 nm, respectively, the resistance of the sensor part 15 is 10 $\Omega$. On the other hand, since the lower and upper magnetic shields 12 and 13 have a resistivity $\rho$ of about 16000 $\mu\Omega\cdot$cm, and the thickness of each is 1.6 $\mu$m, the resistance of each magnetic shield at the sensor region is 100 $\Omega$. That is, since the resistance between both of the electrodes 16 changes only by about 10%, that is, from 10 $\Omega$ to 9.1 $\Omega$, even if sensing current leaks to each magnetic shield, the sensor part 15 of the magnetoresistive effect type element does not break down. Further, since sensing current flowing in the sensor part 15 decreases only by 9%, the output of the sensor part 15 decreases by about 17%, and so the sensor part 15 still has a sufficient signal reproducing ability. In the above-mentioned discussion, it was assumed that a short-circuit could be caused by pin holes and the like, which are generated in the insulation film 14 or 14' between the sensor part 15 of the magnetoresistive effect type element and one of the magnetic shields 12 and 13. If a short circuit does not occur in the insulation films 14 and 14', the amount of current shunted to the magnetic shields 12 and 13 will be less than the above-mentioned estimation, and the decreased power of the reproduced output also will be below the above-mentioned estimation level. Further, although the resistance of the magnetic shields 12 and 13 is estimated for the sensor region of the magnetoresistive effect type element, the thickness of each magnetic shield, at the region other than the vicinity of the sensor part 15, is set so as to be considerably thicker. Therefore, the sensing current hardly leaks to the magnetic shields, and so the above estimation model is reasonably conservative. In this embodiment, the upper and lower magnetic shield films 12 and 13 are each composed of only a Fe—Si—O film possessing a resistivity $\rho$ of 16000 $\mu\Omega\cdot$cm. However, it is possible to use a magnetic multi-layer film by alternately laminating a high-resistance magnetic film and an insulating film.

Figure 2:
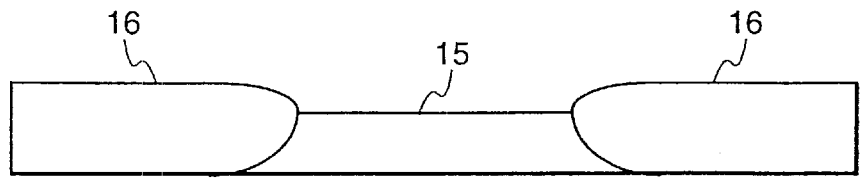
FIG. 2 is an elevational view of a magnetoresistive effect type element.

FIG. 2 shows a conceptual illustration of the magnetoresistive effect type element (hereafter, referred to as an MR element). The MR element is composed of the sensor part 15 (MR layer) and the electrodes 16, including hard magnetic bias layers for generating a vertical bias in the MR layer. Further, the electrodes 16, including the hard magnetic bias layers, possess an electrical and magnetic continuity with the MR sensor 15. Although the hard magnetic bias film in the electrodes 16, each of which includes a hard magnetic bias layer, can be composed of a single alloy layer of CoCr, CoPt, CoCrPt, etc., it is desirable to compose the bias film with one of the above alloy layers and a metal layer of W, Au, Cr, etc., which is used as an upper or lower layer in the bias film. The thickness of the hard magnetic bias film is set such that a predetermined bias flux can be obtained. Moreover, a lateral bias which is also necessary for the MR sensor 15 is realized by using a soft film bias, a branch bias, a spiral bias, or any other comformable lateral bias.

Figure 3:
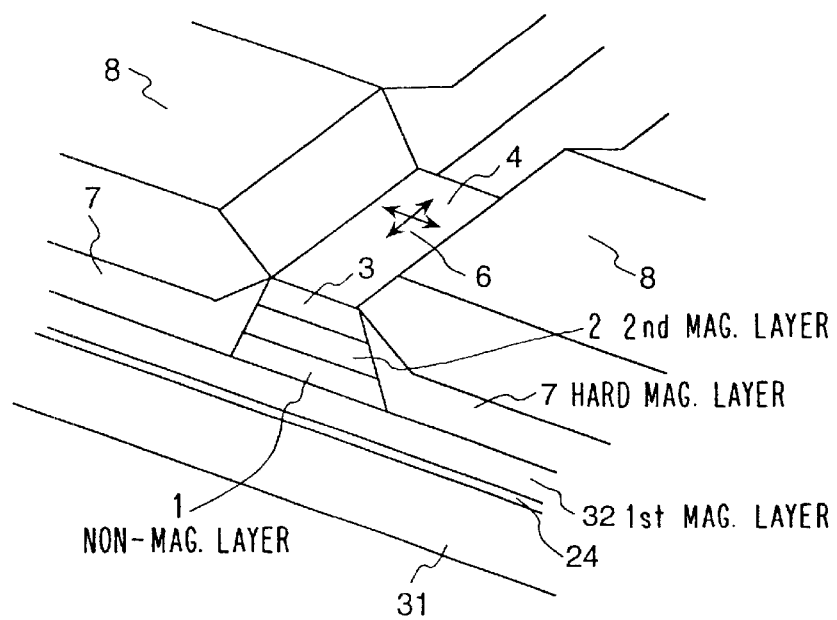
FIG. 3 is a perspective view of a spin-valve magnetoresistive effect type reproducing head representing another embodiment according to the present invention.

FIG. 3 shows a perspective view of a magnetic head using a spin-valve magnetoresistive film (MR sensor), representing another embodiment according to the present invention.

The MR sensor of the present invention has a multi-layer structure in which a first magnetic layer 32 of soft ferromagnetic material, a non-magnetic layer 1, and a second magnetic layer 2 of ferromagnetic material, are laminated on a substrate 31 made of glass, ceramic, etc. The two ferromagnetic layers 32 and 2 are composed so that the angle between the magnetized directions of the two layers is about 90 deg. when a magnetic field is not applied to those layers. Further, the magnetized direction of the second magnetic layer 2 is fixed so as to be in the same direction as that of a magnetic record medium. The magnetized direction of the first magnetic layer 32 of soft ferromagnetic material is inclined by 90 deg. relative to the magnetic field direction of the second magnetic layer 2 when the magnetic field is not applied to the first magnetic layer 32. If the magnetic field is applied, a rotation of the magnetization in the first magnetic layer 32 occurs in response to the application of the magnetic field, and the magnetization direction of the first magnetic layer 32 changes. Numeral 8 indicates electrodes.

To keep a single magnetic domain state in the first magnetic layer 32 oriented in a direction parallel to the surface of the paper, a means for generating a vertical bias is provided for the first magnetic layer 32. The hard ferromagnetic layer 7 possessing a high saturation magnetic coercive force, a high orthogonal magnetic property, and a high resistance, is used as the means for generating the vertical bias. The hard ferromagnetic layer 7 contacts the side end region on the surface of the first magnetic layer 32 of soft ferromagnetic material. The magnetized direction of the hard ferromagnetic layer 7 is parallel to the surface of the paper.

Further, it is also possible to generate the necessary vertical bias by providing an antiferromagnetic layer in contact with the side end region of the first magnetic layer 32, in place of the ferromagnetic layer 7. As for this antiferromagnetic layer, it is desirable to use antiferromagnetic material possessing a blocking temperature sufficiently different from that of the antiferromagnetic layer 3 used to fix the magnetized direction of the second magnetic layer 2 of ferromagnetic material.

Embodiment 2

Figure 4:
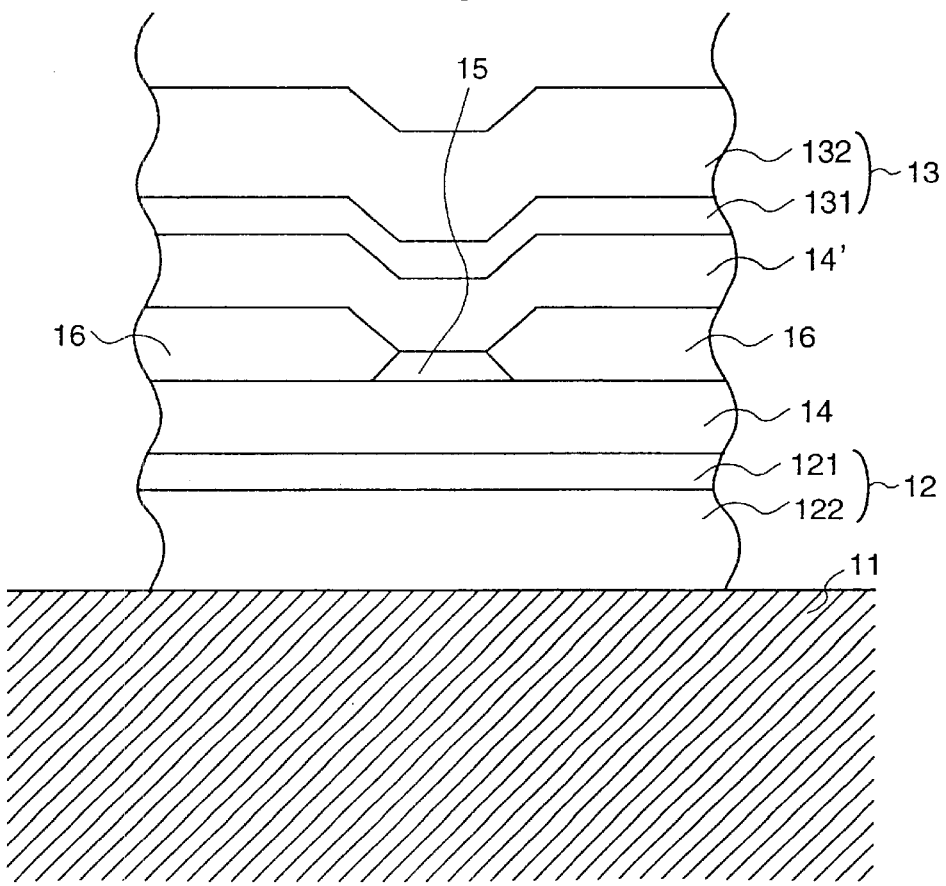
FIG. 4 is an elevational cross section, seen from a side facing a recording medium, of a magnetoresistive effect type reproducing head, representing another embodiment according to the present invention.

FIG. 4 shows an elevational cross section, showing a side facing a recording medium, of a magnetoresistive effect type reproducing head, representing another embodiment according to the present invention. In this embodiment, each of the upper magnetic shield 12 and the lower magnetic shield 13 has the multi-layer structure which is composed of a low-resistance magnetic shield film 122 or 132 of 46Ni—Fe ($\rho$:about 45 $\mu\Omega$·cm, and the thickness: 1.5 $\mu$m) formed by an electroplating method and a high-resistance magnetic shield film 121 or 131 of Fe—Ni—O ferrite ($\rho$: about 1 $\mu\Omega$cm, the thickness: 0.5 $\mu\Omega$·cm) formed by an electroplating method. Moreover, a spin-valve type giant magnetoresistive effect film is used for the sensor part 15 of the magnetoresistive effect type element, and the sensor part 15 has the multilayer structure composed by laminating layers of Ta (5 nm)/CrMnPt (30 nm)/CoFe (3 nm)/Cu (2 nm)/CoFe (1 nm/NiFe (5 nm)/Ta (5 nm) in this order from the upper part. Since the free layer in the spin-valve type film is made of a CoFe/NiFe layer in this embodiment, the thickness of the lower inter-layer insulation film 14 formed on the lower magnetic shield 12 and the thickness of the upper inter-layer insulation film 14' formed on the magnetoresistive effect type element are set to 85 nm and 50 nm, respectively, so that the free layer is positioned at the center of the magnetic gap. That is, the interval of the magnetic gap is 0.186 $\mu$m. In ferrite material, such as the Fe—Ni—O material used in this embodiment, since its resistivity is high enough, the insulation break-down of the magnetoresistive effect type element hardly occurs. Further, it is possible to set the thickness of the insulation film between the magnetoresistive effect type element and each of the upper and lower magnetic shields to almost 0 by optimizing the high-resistance shield films (high resistivity, very thin thickness, and improvement in soft magnetic characteristics). For example, in the spin-valve type giant magnetoresistive effect film, it is possible to set the thickness of the insulation film 14 formed on the lower magnetic shield 12 to 35 nm, and set the thickness of the insulation film 14' formed on the magnetoresistive effect type element to 0. That is, it is possible to reduce the interval of the magnetic gap to 86 nm. Furthermore, it is possible to use a magnetic multi-layer film formed by alternately laminating a magnetic film and an insulation film for one or one pair of the high-resistance upper and lower magnetic shields 121 and 131, and one or one pair of the low-resistance upper and lower magnetic shields 122 and 132.

Embodiment 3

Figure 5A:
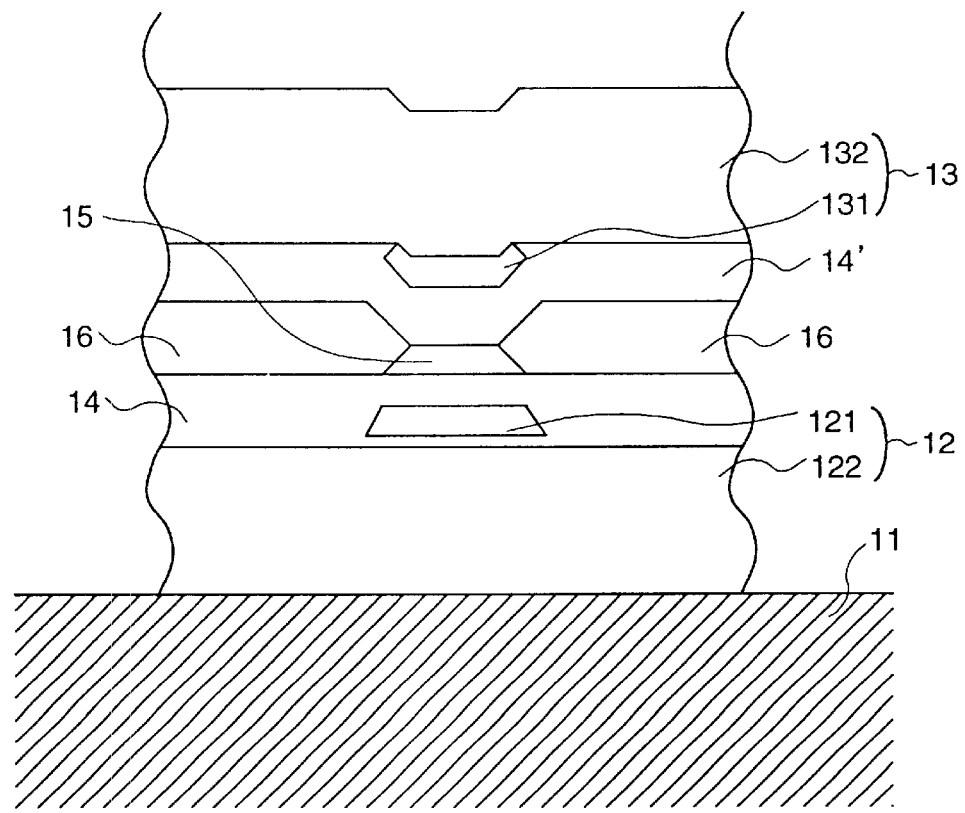
FIG. 5A and FIG. 5B show, respectively, an elevational cross section, seen from a side facing a recording medium, of a magnetoresistive effect type reproducing head another embodiment according to the present invention, and a plan view of an arrangement of the magnetoresistive effect type element and an upper magnetic shield having a high resistivity.
Figure 5B:
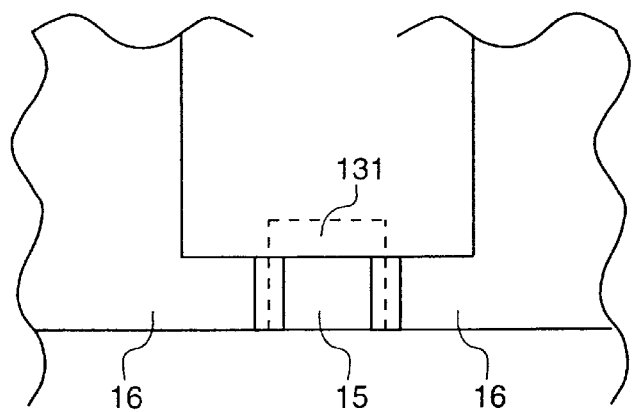

FIG. 5A and FIG. 5B show the composition of a magnetoresistive effect type reproducing head of another embodiment according to the present invention. FIG. 5A is an elevational cross section showing a side facing a recording medium, and FIG. 5B is a plan view of the arrangement of the sensor part 15 forming a magnetoresistive effect type element, the electrodes 16, and an upper magnetic shield 131 (region surrounded by dashed lines) of high resistivity. In this embodiment, the interval between the high-resistance upper and lower magnetic shields 131 and 121 is set to 0.146 $\mu$m. In a method of producing the magnetoresistive effect type reproducing head of this embodiment, at first, a 46Ni—Fe film having a 2 $\mu$m thickness is formed on the substrate 11 and is processed to have the shape of the lower magnetic shield. Further, after a Fe—Ni—O ferrite film ($\rho$: about 1 $\Omega$·cm) having a 0.5 $\mu$m thickness is deposited by an electroplating method, a mask to cover the region forming the sensing part of the magnetoresistive effect type element is formed, and an Al$_2$O$_3$ film is deposited to a thickness of 0.5 $\mu$m. Further, the part of the Al$_2$O$_3$ deposited on the mask is removed together with the mask. After an Al$_2$O$_3$ film is deposited to a thickness of 65 nm, the sensor part 15 of the spin-valve type magnetoresistive effect element and the electrodes 16 are formed. Furthermore, an Al$_2$O$_3$ film is deposited to a thickness of 30 nm, and a Fe—Ni—O ferrite film having a 0.5 $\mu$m thickness is formed by an electroplating method. A mask to cover the region forming the sensing part of the magnetoresistive effect type element is formed, and an Al$_2$O$_3$ film is deposited to a thickness of 0.5 $\mu$m. Further, the part of the Al$_2$O$_3$ film formed on the mask is removed together with the mask. Further, a 46Ni—Fe film is deposited to a thickness of 2 $\mu$m, and is processed to have the shape of the upper magnetic shield. In ferrite material, such as the Fe—Ni—O material used in this embodiment, since its resistivity is sufficiently high, insulation breakdown of the magnetoresistive effect type element hardly occurs. Further, it is possible to set the thickness of the insulation film formed between the magnetoresistive effect type element and one of the upper and lower magnetic shields to almost 0 by optimizing the high-resistance shield films. Furthermore, it is possible to use a magnetic multi-layer film formed by alternately laminating a magnetic film and an insulation film for one or one pair of the high-resistance upper and lower magnetic shields 121 and 131, and one or one pair the low-resistance upper and lower magnetic shields 122 and 132.

Embodiment 4

Figure 6:
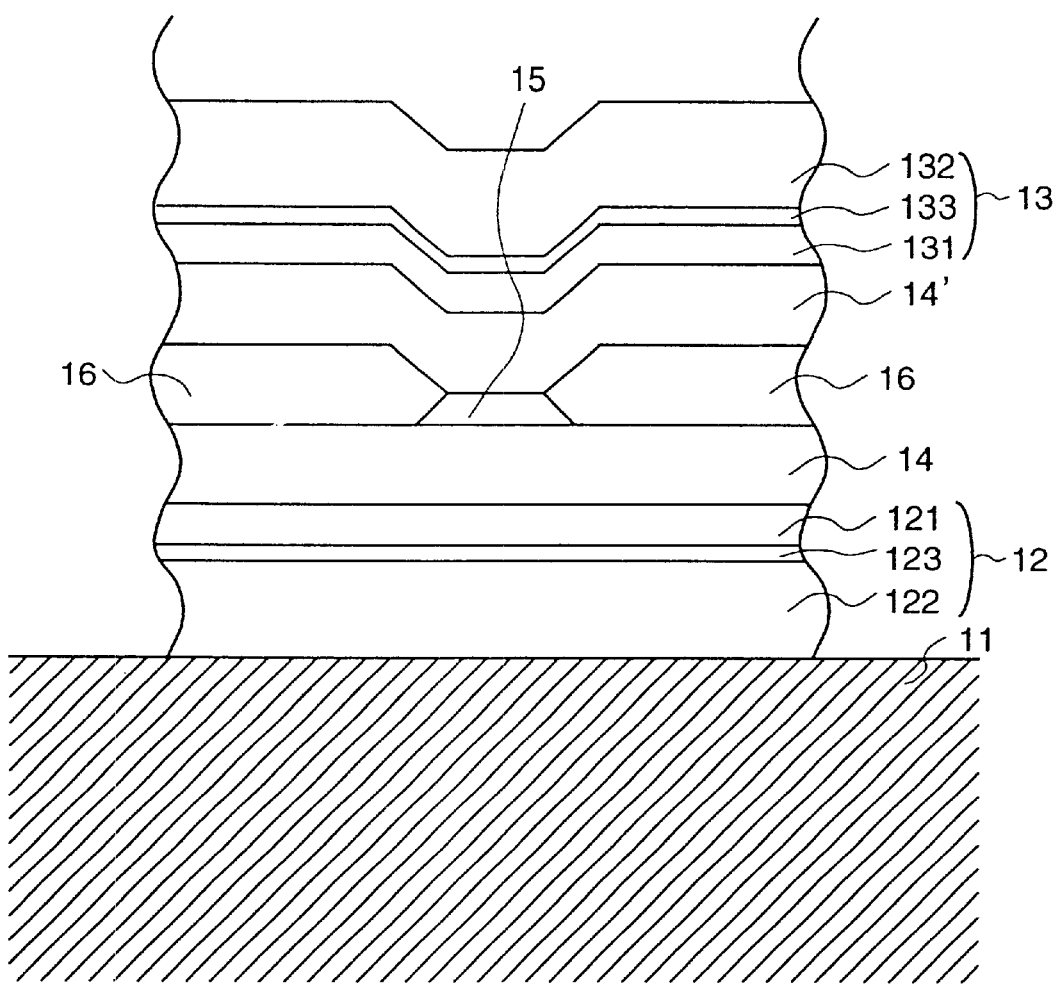
FIG. 6 is an elevational cross section, seen from a side facing a recording medium, of a magnetoresistive effect type reproducing head, representing another embodiment according to the present invention.

FIG. 6 shows an elevational cross section, on a side facing a recording medium, of a magnetoresistive effect type reproducing head, representing another embodiment according to the present invention. In this embodiment, the lower and upper magnetic shields 12 and 13 are composed of a low-resistance magnetic shield film (122 or 132) of 80Ni—Fe permalloy, an inter-layer insulation film (123 or 133) of Al$_2$O$_3$, and a high-resistance magnetic shield film (121 or 131) of Fe—Hf—O ($\rho$: about 2000 $\mu\Omega$·cm). The thickness of each of the lower and upper magnetic shield films is 2 $\mu$m, and the distance in the magnetic gap is 0.18 $\mu$m. The upper magnetic shield 13 is composed by laminating layers of 80Ni—Fe (1.8 $\mu$m)/Al$_2$O$_3$ (50 nm)/Fe—Hf—O (0.2 $\mu$m) in this order from the upper part, and the lower magnetic shield 12 is composed by laminating those layers in the reverse order. The composition of the magnetoresistive effect type element used in this embodiment is similar to that in the first embodiment, and the resistance of the sensor part 15 is about 10 $\Omega$. Further, since the resistivity $\rho$ of the high-resistance magnetic shield film is approximately 2000 $\mu\Omega$·cm, and its thickness is 0.2 $\mu$m, the resistance of a part of the magnetic shield film, which is positioned over or under the sensor region, is approximately 100 $\Omega$ and is sufficiently larger than that of the sensor part 15. Therefore, even if current leaks to the magnetic shield, the output of the sensor part 15 decreases only a little, and its signal reproducing ability can be maintained. Furthermore, it is possible to use a magnetic multi-layer film formed by alternately laminating a magnetic film and an insulation film for one or one pair of the high-resistance upper and lower magnetic shields 121 and 131, and one or one pair of the low-resistance upper and lower magnetic shields 122 and 132.

Embodiment 5

Figure 7A:
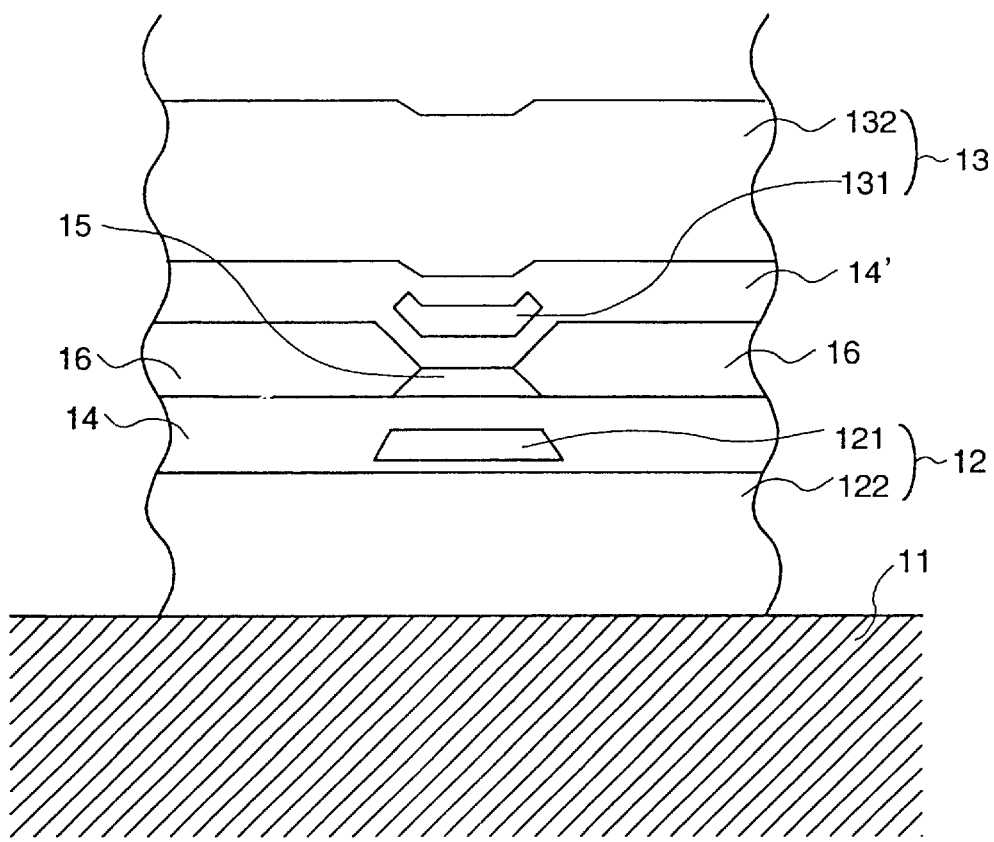
FIG. 7A and FIG. 7B show, respectively, an elevational cross section, seen from a side facing a recording medium, of a magnetoresistive effect type reproducing head, representing another embodiment according to the present invention, and a plan view of an arrangement of the magnetoresistive effect type element and an upper magnetic shield having a high resistivity.
Figure 7B:
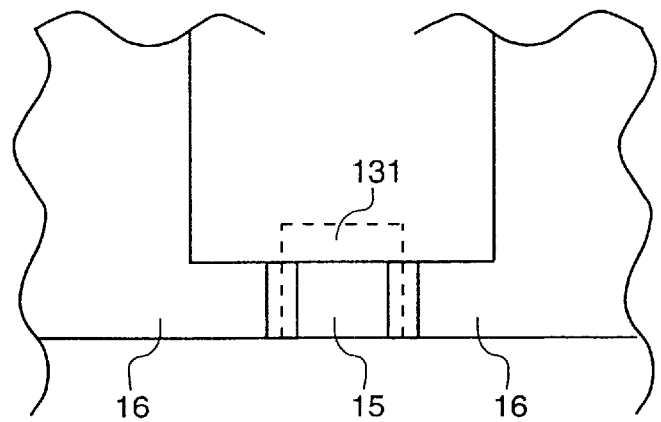

FIG. 7A and FIG. 7B show the composition of a magnetoresistive effect type reproducing head representing another embodiment according to the present invention. FIG. 7A is an elevational cross section facing a recording medium, and FIG. 7B is a plan view of the arrangement of the high-resistance upper magnetic shield 131 (a region surrounded by dashed lines), the sensor part 15 of the magnetoresistive effect type element, and the electrodes 16. In this embodiment, the interval between the high-resistance upper and lower magnetic shields 131 and 121 is set to 0.14 $\mu$m. In a method of producing the magnetoresistive effect type reproducing head of this embodiment, at first, a 80Ni—Fe film having a 2 $\mu$m thickness is formed on the substrate 11 and is processed to have the shape of the lower magnetic shield. Further, after $Al_2O_3$ is deposited to a thickness of 30 nm, a Co—Fe—B—Si—O ferrite film ($\rho$: about 500 $\mu\Omega$·cm) having a 0.5 nm thickness is formed, and a mask shaped to cover the region forming the sensing part of the magnetoresistive effect type element is provided. Further, an $Al_2O_3$ film is deposited to a thickness of 50 nm, and the portion of the $Al_2O_3$ formed on the mask is removed together with the mask. After an $Al_2O_3$ film is deposited to a thickness of 30 nm, the sensor part 15 and the electrodes 16 are formed. Furthermore, an $Al_2O_3$ film is deposited to a thickness of 60 nm, and a Co—Fe—B—Si—O ferrite film having a 50 nm thickness is formed by an electroplating method. A mask to cover the region forming the sensing part of the magnetoresistive effect type element is formed, and an $Al_2O_3$ film is deposited to a thickness of 50 nm. Further, after the portion of the $Al_2O_3$ film formed on the mask is removed together with the mask, $Al_2O_3$ is deposited to a thickness of 30 nm. Lastly, a 46Ni—Fe film is deposited to a thickness of 2 $\mu$m and is processed to have the shape of the upper magnetic shield. Since the resistance of the sensor part 15 of the magnetoresistive effect type element is about 10 $\Omega$, and the resistivity p of the high-resistance magnetic shield film and its thickness are approximately 2000 $\mu\Omega$·cm and 0.2 $\mu$m, respectively, the resistance of a part of the magnetic shield film, which is positioned over or under the sensor region, is approximately 100 $\Omega$ and is sufficiently larger than that of the sensor part 15. Therefore, even if current leaks to the magnetic shield, the output of the sensor part 15 decreases only a little, and its signal reproducing ability can be maintained. Furthermore, it is possible to use a magnetic multi-layer film formed by alternately laminating a magnetic film and an insulation film for one or one pair of the high-resistance upper and lower magnetic shields 121 and 131, and one or one pair of the low-resistance upper and lower magnetic shields 122 and 132.

Embodiment 6

In the above embodiments 1–5, the structure of the upper magnetic shield 13 is the same as that of the lower magnetic shield 12. However, it is possible to use a 80Ni—Fe permalloy film, a Fe—Al—Si Sendust film, a Co non-crystalline film, or a magnetic multi-layer film composed by alternately laminating one of those magnetic films and an insulation film, which have been conventionally used, for the lower magnetic shield, and to use a high-resistance magnetic material for only the upper magnetic shield 13. Furthermore, it is also possible to use a multi-layer film composed of a conventional material layer, an insulation layer, and a high-resistance magnetic material layer, as shown in FIG. 5, for the lower magnetic shield 12, and to use a high-resistance material for only the part in the upper magnetic shield 13, which is positioned over or under the sensor region, as shown in FIG. 6, and further, it is possible to use a combination of the compositions shown in FIG. 5 and FIG. 6. Moreover, although insulation films of $Al_2O_3$ are used in the above embodiments, it is possible to use an oxide, such as $SiO_2$, or a nitride, such as SiN, for the insulation films. Furthermore, in not only the second and third embodiment, but also any one of the above-mentioned embodiments, it is possible to set the thickness of one or both the insulation film formed between the magnetoresistive effect type element and one of the upper and lower magnetic shields to almost 0 by optimizing the high-resistance shield films.

Moreover, although the magnetic resistance reading converter including a hard magnetic bias film is used as the magnetoresistive effect type element in the embodiments 1–5, it is possible to use a magnetoresistive effect type element to which exchange coupling with an antiferromagnetic film is applied, for magnetic domain control.

Further, in the examples 1–5, it is possible to use any one of the MR element shown in FIG. 2, the spin valve magnetoresistive effect type element shown in FIG. 3, and the giant magnetoresistive effect element, as the magnetoresistive effect type element.

Embodiment 7

Figure 8:
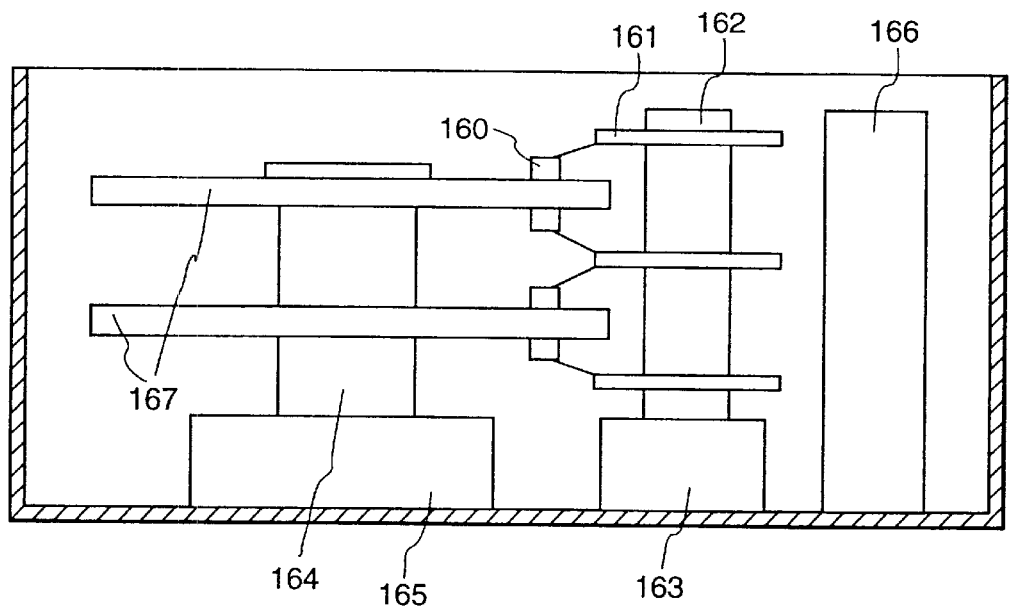
FIG. 8 is a conceptual diagram for showing the composition of a hard disk apparatus.

FIG. 8 is a conceptual diagram for showing the composition of a hard disk apparatus using the magnetoresistive effect type reproducing head and the spin-valve magnetoresistive effect type reproducing head of the embodiments 1–7. This hard disk apparatus has a disk rotating shaft 164 and a spindle motor 165 for rotating the shaft 164 at a high speed, and one or more (two in this embodiment) magnetic disks 167 are attached to the disk rotating shaft 164 with a predetermined spacing. The attached magnetic disks 167 rotate together with the disk rotating shaft 164. Each magnetic disk is a circular plate of a predetermined radius and a predetermined thickness, and permanent magnet films are formed on both surfaces of each magnetic disk, each permanent magnet film operating as an information recording surface. Moreover, this magnetic disk apparatus includes a rotating shaft 162 for positioning a respective magnetic head slightly off of the surface of each of the magnetic disks 167, and a voice coil motor 163 for driving the shaft 162. Further, a plurality of access arms 161 are attached to the rotating shaft 162, and a recording/reproducing head 160 (hereafter, simply referred to as a head) is attached at the end of each access arm 161. Therefore, each head 160 is moved radially by rotating the head 160 by a predetermined angle using the rotating shaft 162, and is positioned at a designated place relative to a disk. Moreover, the position of each head 160 is spaced from the surface of each disk 167 by about tens of nm by a balance between buoyancy generated by the high-speed rotation of the disk 167 and the pressing force due to gimbals of an elastic member composing a part of the arm 161. The spindle motor 165 and the voice coil motor 163 are connected to a hard disk controller 166, and the rotation speed and the positioning of the head 160 are controlled by the hard disk controller 166.

Figure 9:
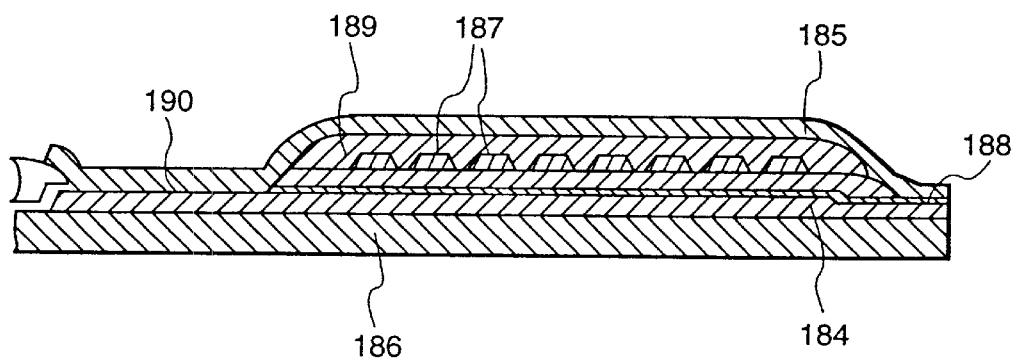
FIG. 9 is a longitudinal cross section of a magnetic induction type recording head.

FIG. 9 shows a longitudinal cross section of a magnetic induction type thin film recording head for use in the hard disk apparatus according to the present invention. This thin film head includes a lower magnetic shield film 186, a lower magnetic film 184 formed on the film 186, and an upper magnetic film 185. A non-magnetic insulation substance 189 exists between the magnetic films 184 and 185. Numeral 188 indicates a magnetic gap. A slider having an air bearing surface (ABS) supports the head. Further, while a disk is rotated, the slider approaches the recording medium of the rotating disk and generates a buoyancy.

Furthermore, the thin film magnetic head possesses a back gap 190 which is formed by the upper and lower magnetic films 185 and 184. The back gap 190 is separated from the top part of the magnetic gap 188 via a coil 187.

The coil 187 is formed above the lower magnetic film 184, for example, by an electroplating method, and the coil 187 and the film 184 are electromagnetically connected to each other. Further, the coil 187 is buried in the insulation substance 189, and electrical contacts are provided at its central part and outside end terminal. Those contacts are connected to an electrical power line and a head circuit for reading out/writing in information (which are not shown in the figure).

In accordance with the present invention, a thin film wire forming the coil 187 is wound in a somewhat distorted elliptical shape, and a narrower width part in the thin film wire is arranged nearest to the magnetic gap 188. The width of the thin film wire is made gradually larger as the wire is farther away from the magnetic gaps 188.

The coil 187 provided between the gap 190 and the magnetic gap 188 has bends and many turns, and the width of the thin film wire forming the coil 187 is comparatively narrow in the vicinity of the gap 190 or the magnetic gap 188. The rapid increase of the width in the thin film wire in a region far away from the magnetic gap 188 causes a decrease in the resistance. Further, since the elliptical shaped coil 187 has no angular part or sharp corner, it does not include a part having a specially large resistance. Moreover, an elliptic coil has a shorter length in comparison with a rectangular coil or a circular coil. Therefore, the total resistance of the coil 187 is comparatively small, and the heat generated in it is also comparatively little. Further, an adequate treat radiating performance can be realized in the elliptical coil 187. Accordingly, since heat generation is reduced, layer destruction in the multi-layer thin film, and layer elongation or layer expansion of the multi-layer thin film, can be prevented. Thus, the cause of a ball-chip projection at the air bearing surface (ABS) can be removed.

An elliptical coil in which the width of a thin film layer coil wire is changed at a constant change rate can be formed by a conventional cheap electroplating method, such as a sputtering method, a vapor deposition method, and so forth. In a coil of another shape, especially, a shape having an angle, the width in a coil wire formed by an electroplating method tends to be non-uniform. In an elliptical coil, removing small parts projecting from sides of a thin film layer wire formed into a coil loads only a small stress on the coil.

In this embodiment, a coil of many turns is formed into an approximately elliptical shape between the magnetic cores (magnetic films) 184 and 185, and its width is made gradually larger from the magnetic gap 188 toward the back gap 190. Corresponding to the increase in the coil wire width, the signal output increases, and the generated heat decreases.

Figure 10:
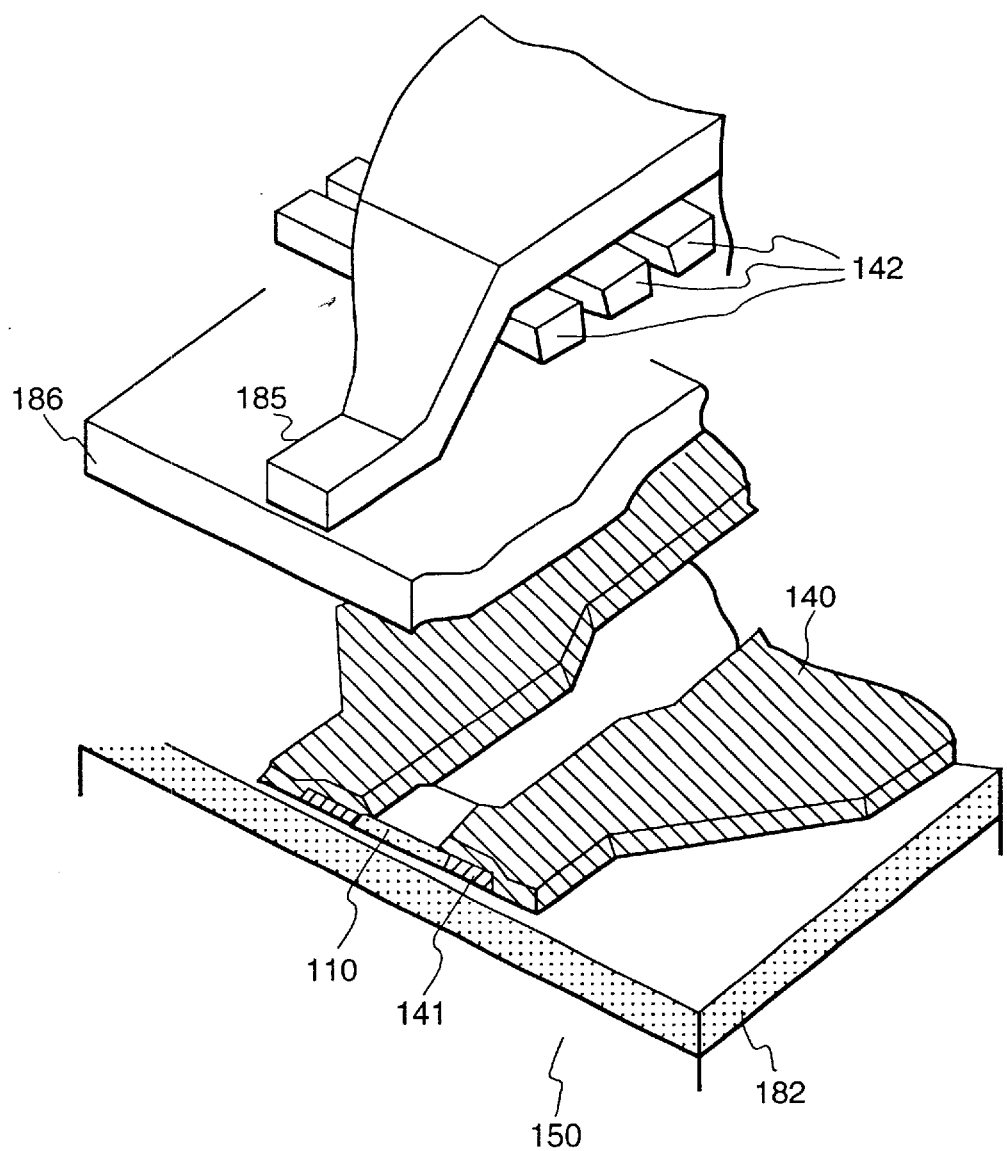
FIG. 10 is a perspective view partially in section, of a recording-reproducing separation type magnetic head.

FIG. 10 is a perspective view, partially in section, of a recording-reproducing separation type magnetic head including the magnetic induction type recording head and the magnetoresistive effect type reproducing head according to the present invention. The recording reproducing separation type magnetic head consists of a reproducing head including a lower magnetic shield 182, a magnetoresistive effect film 110, a magnetic domain control film 141, and electrode terminals 140, which are formed on a substrate 150 serving also as a head slider, and the magnetic induction type recording head in which a magneto-motive force is generated between the upper magnetic core 185, serving also as an upper magnetic shield, and the lower magnetic core 186, serving also as a lower magnetic shield, by an electromagnetic effect produced by a coil 142.

Figure 11:
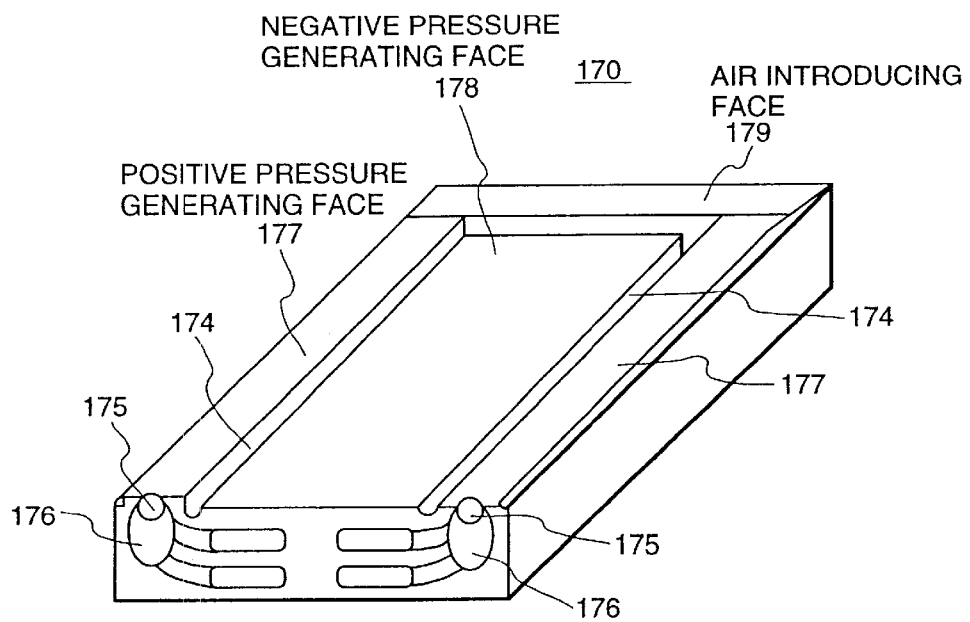
FIG. 11 is a perspective view of a negative pressure slider.

FIG. 11 is a perspective view of a negative pressure slider. The negative pressure slider 170 is composed of a negative pressure generating surface 178, surrounded by an air introducing surface 179 and two positive pressure generating surfaces 177 for generating buoyancy, and a groove 174 provided at a boundary region between the negative pressure generating surface 178 and both the air introducing surface 179 and the positive pressure generating surfaces 177. At the end sides 175 of air outlets, the recording-reproducing separation type magnetic thin film head elements 176, including the magnetic induction type recording head for recording information in the magnetic disk and the MR sensor for reproducing the information recorded in the magnetic disk, are installed.

While the negative pressure slider 170 is floating, air introduced through the air introducing surface 179 is expanded on the negative pressure generating surface 178. Further, since air flow is also branched to the groove 174, air flow passing from the air introducing surface 179 to the end sides of air outlets 175 exists in the groove 174. Therefore, even if floating dust is introduced through the air introducing surface 179, while the negative pressure slider 170 is floating, the dust is guided to the inside of the groove 174. Further, the dust is swept along in the air flow and is exhausted from the end sides 175 of the air outlets to the outside of the negative pressure slider 170. Furthermore, since air always flows and stagnation of air does not exist while the negative pressure slider 170 is floating, the introduced dust does not cohere.

Figure 12:
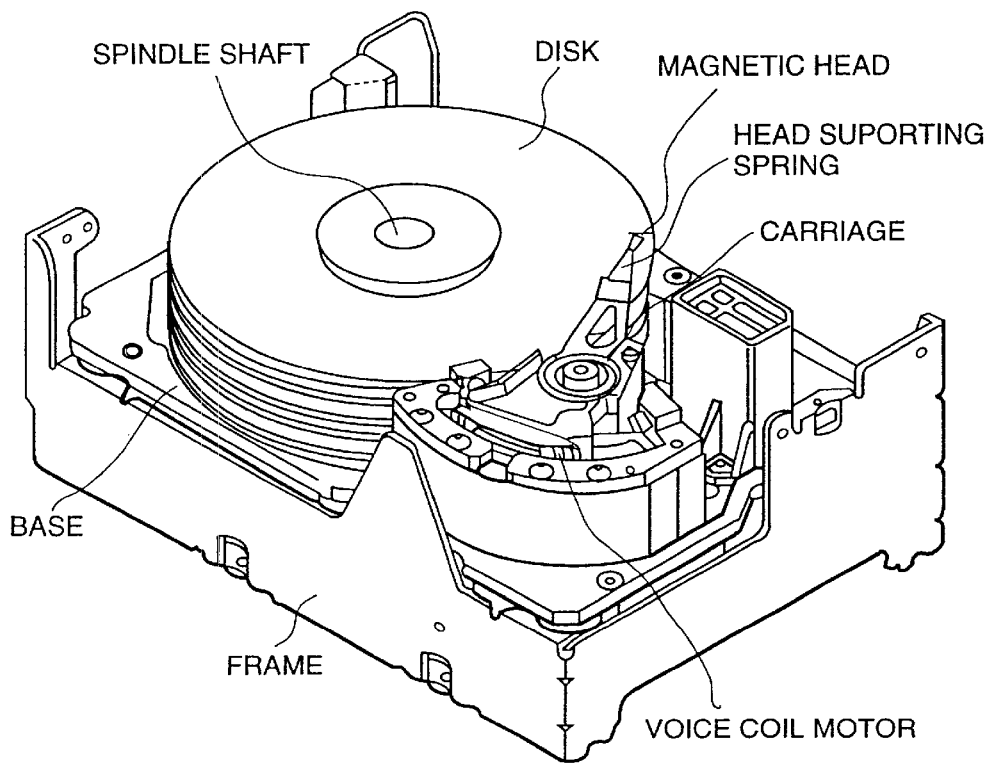
FIG. 12 is a perspective inside view of a magnetic disk apparatus.

FIG. 12 shows a perspective inside view of a magnetic disk apparatus. The magnetic disk apparatus is composed of a magnetic disk for recording information, a DC motor for rotating the magnetic disk (not shown in the figure), a magnetic head for writing in/reading out information, and a positioning device including an actuator, a voice coil motor, etc., for supporting the magnetic head and positioning it with respect to the magnetic disk. In this example, five disks are attached to a rotating shaft to increase the total memory capacity.

According to this embodiment, also for a medium with a high coercive force, the MR sensor exhibits an excellent performance in a high frequency region, providing a data transmission rate of more than 15 MB/s, and a recording frequency of more than 45 MHz, in a state where the disk rotation speed is more than 4000 rpm. That is, it becomes possible to obtain a highly sensitive MR sensor exhibiting excellent MR effects, such as reduction of the access time and an increase in the memory capacity. Thus, it is possible to realize a magnetic disk apparatus possessing a surface recording density of more than 10 Gb/in$^2$.

In accordance with the present invention, even if the sensing current shunts to one of the upper and lower magnetic shields because of degradation in the withstand voltage between a magnetoresistive effect type element and each magnetic shield, which is caused when the magnetic gap of a reproducing head, determined by the interval between the upper and lower magnetic shields, is narrowed, the degradation of the withstand voltage can tee prevented, and insulation break-down in the magnetoresistive effect type element hardly occurs, since the resistance of the magnetic shields is high, and the shunting amount of the sensing current is restricted. Further, it is possible to provide a magnetoresistive effect type reproducing head in which even if the sensing current shunts to the magnetic shields, the signal reproducing output decreases only a little, and the signal reproducing ability of the head can be maintained. Furthermore, by using a magnetoresistive effect type reproducing head in which the magnetic gap is narrow, according to the present invention, since the interval between the recording head and the reproducing head can be also narrowed, it is possible to provide a magnetic disk in which the linear recording density is high and the necessary azimuth correction is small.

What is claimed is:

1. A magnetic head formed by stacking a lower magnetic shield made of magnetic material, a lower inter-layer insulating film, a magnetoresistive effect type element for detecting a magnetic field by using a magnetoresistive effect, an upper inter-layer insulation film, and an upper magnetic shield made of magnetic material, on a substrate in this order, wherein at least one of said lower and upper magnetic shields includes a magnetic layer made of NiFe alloy and a magnetic layer made of a material including at least one element selected from the group consisting of Co, Fe and Ni and at least one element selected from the group consisting of O, N, F, C, P, S and B which neighbor each other via insulation material.

2. A magnetic head comprising:
a lower magnetic shield;
a lower inter-layer insulation film formed on said lower magnetic shield;
a magnetoresistive effect type element formed on said lower inter-layer insulation film;
an upper inter-layer insulation film formed on said magnetoresistive element; and
an upper magnetic shield formed on said upper inter-layer insulation film;
wherein said lower magnetic shield or said upper magnetic shield is a multi-layer film including a magnetic layer made of a material including at least one element selected from the group consisting of Co, Fe, and Ni, and at least one element selected from the group consisting of O, N, F, C, P, S and B.

3. A magnetic head according to claim 2, wherein said magnetic layer made of a material including at least one element selected from the group consisting of Co, Fe and Ni, and at least one element selected from the group consisting of O, N, F, C, P, S and B, is provided between (1) all other layers of said lower magnetic shield and (2) said inter-layer insulation film, or (1') between all other layers of said upper magnetic shield and (2') said upper inter-layer insulation film.

4. A magnetic head according to claim 2, wherein said lower magnetic shield or upper magnetic shield is formed by alternatively laminating a magnetic film and an insulating film.

* * * * *